United States Patent
Morales et al.

(10) Patent No.: US 7,502,137 B2
(45) Date of Patent: Mar. 10, 2009

(54) AUTOMATED MEDIA SELECTION FOR IMPOSED PRINT JOBS

(75) Inventors: Javier A. Morales, Rochester, NY (US); Michael A. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 932 days.

(21) Appl. No.: 11/010,141

(22) Filed: Dec. 10, 2004

(65) Prior Publication Data

US 2006/0126119 A1 Jun. 15, 2006

(51) Int. Cl.
- G06K 15/00 (2006.01)
- H04N 1/60 (2006.01)
- H04K 1/00 (2006.01)
- G07B 17/02 (2006.01)
- G01M 3/00 (2006.01)

(52) U.S. Cl. .............. 358/1.18; 358/1.9; 358/1.15; 705/52; 705/408; 377/17; 377/24

(58) Field of Classification Search ............... 358/1.15, 358/1.16, 1.18, 1.9; 705/52, 408; 377/17, 377/24

See application file for complete search history.

(56) References Cited

U.S. PATENT DOCUMENTS

| | | | | |
|---|---|---|---|---|
| 5,117,258 A | * | 5/1992 | Iwata | 399/79 |
| 5,191,429 A | | 3/1993 | Rourke | 358/296 |
| 5,383,129 A | * | 1/1995 | Farrell | 705/400 |
| 6,667,814 B1 | * | 12/2003 | Tillotson | 358/1.15 |
| 6,771,384 B1 | * | 8/2004 | Laverty et al. | 358/1.15 |
| 2006/0082793 A1 | * | 4/2006 | Goel et al. | 358/1.2 |

* cited by examiner

Primary Examiner—Mark K Zimmerman
Assistant Examiner—Mesfin Getaneh
(74) Attorney, Agent, or Firm—Kermit D. Lopez; Luis M. Ortiz; Ortiz & Lopez, PLLC

(57) ABSTRACT

A method using a printing system comprising a controller programmed for rendering imposed documents given media cost considerations is described. The method includes steps of: evaluating a print job; evaluate media loaded within printer; and determining media print options including cost. Additionally, embodiments enable user selection of printing option prior to the printing system or rendering the print job or selecting a printing option based on user profile. The print job is then rendered.

20 Claims, 2 Drawing Sheets

AUTOMATED MEDIA SELECTION FOR IMPOSED PRINT JOBS

TECHNICAL FIELD

Embodiments generally relate to print job medium management. More particularly, the embodiments relate to the automation of print job parameter selection processes related to rendering imposed documents on media and automation of print job parameter selection processes related to rendering imposed documents given media cost considerations.

BACKGROUND

U.S. Pat. No. 5,191,429, issued March, 1993, to the assignee of the present invention is hereby incorporated by reference. The '429 patent describes systems and methods for printing multiple images where the size of paper stock on which the multiple images are to be printed is determined and the maximum number of images that can be printed on the paper stock without interference is calculated.

The cost of printing a job varies depending on several factors. These include (but are not limited to) the cost of the media (with glossy, heavy weight paper costing more than uncoated lightweight paper), the click charge and the prepress programming time spent in getting the job to print. Printers can manage costs by ensuring that jobs get printed on the cheapest possible media. Although not appropriate for every job, portions of print jobs can and should be printed on the cheapest media available. Printers can manage costs by recording the smallest click charge per letter-sized document printed. In general a click charge for a tabloid sheet of paper will be less than twice the click charge for a letter sheet of paper. Printing a letter document 2-up on a tabloid sheet of paper and then cutting it in a bindery can result in substantial total cost savings.

With current processes, the print engine operator often handles media selection while the prepress operator typically handles imposition. The decision to impose a document is determined by how much time would be spent modifying the original source document. Documents that are too difficult to impose upstream would consume any click charge savings at prepress time. Imposing documents at the digital front end (DFE) would require an operator that understood imposition. This option may not be feasible for low-skilled workers. Also, imposing at the DFE provides additional room for operator error and the associated lost productivity on the print engine.

Programming job parameters associated with document imposition remains one of the more complicated aspects of job programming printing control systems. This complexity impacts the users' ability to properly program impositions parameters and their ability to include imposition as part of a more automated workflow.

In general, less-experienced system users utilize trial and error routines when selecting imposition parameters. Such routines often result in a user selecting imposition parameters, printing an imposed document, inspecting the printed document to make sure that it has printed as expected/desired, and repeating the process with adjusted imposition parameters should the printout not be acceptable. With automated workflows, imposition complexity causes automatic document imposition during printing operations to be a challenge. Usually, queue parameters are deterministic; therefore, an imposition queue for letter portrait, saddle stitched documents printing landscape on tabloid media can only process jobs that are letter portrait and need to be printed as a landscape document on tabloid media. If a user needs to print the same documents with a bleed, they would have to send it to a queue that is configured to print to 12×18 media.

Print shops with automated workflows end up creating a very large number of queues, each with slightly different imposition parameters, because automatic imposition has stringent requirements for input document characteristics and desired imposition. The large number of queues can become unwieldy to manage while also increasing the chance for routing jobs to the incorrect queue.

Accordingly, it would be desirable to provide a better method of managing imposition programming and printing one media with automated cost considerations. The inventors believe that printers can be programmed to better manage costs by both ensuring that jobs are programmed for the cheapest media possible and also by imposing documents so they print on larger pieces of paper (which can be cut down to size at a later time).

BRIEF SUMMARY OF EMBODIMENTS

It is a feature to provide improved imposition document management processes.

It is another feature to simplify job parameters required to properly print an imposed document.

Another aspect of the present embodiments is for a queued job to be programmable to automatically select media for imposed document rendering. Automatic media selection eliminates the need for novice users to physically select media for imposed jobs.

Another aspect of the embodiments is that the number of queues required to automatically handle imposition is greatly reduced where media selection is automated.

Another aspect of the embodiments automates the process of printing documents in the cheapest way possible. Cost considerations are accomplished by combining the imposition functionality with media cost information retrieved from a media library.

It is another aspect of the embodiments for billing information from the print engine (i.e., click charges) to enable the printer system to automatically print a job in the cheapest way possible according to a user profile, or based on a user's selection at the printer or remote interface.

Accordingly, a method using a printing system comprising a digital front end (DFE) programmed for rendering imposed documents given media cost considerations is described. The method includes steps of: evaluating a print job; evaluate media loaded within printer; and determining media print options including cost. Additionally, embodiments enable user selection of printing option prior to the printing system or rendering the print job or selecting a printing option based on user profile. The print job is then rendered.

BRIEF DESCRIPTION OF THE DRAWINGS

The accompanying figures, in which like reference numerals refer to identical or functionally-similar elements throughout the separate views and which are incorporated in and form part of the specification, further illustrate embodiments of the present invention.

DETAILED DESCRIPTION OF EMBODIMENTS

The particular values and configurations discussed in these non-limiting examples can be varied and are cited merely to illustrate an embodiment of the present invention and are not intended to limit the scope of the embodiments.

Figure 1:
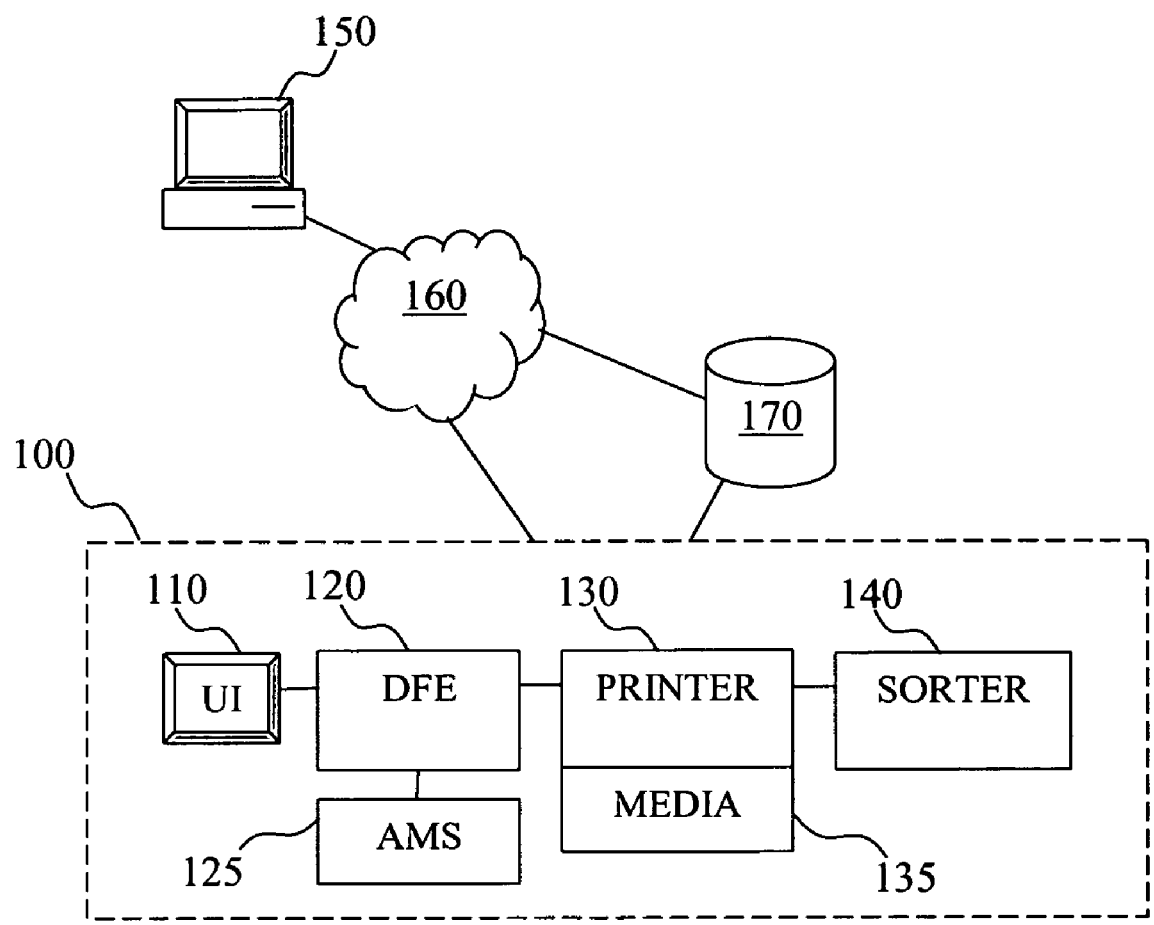
FIG. 1 illustrates components of a printing system utilized in accordance with carrying out the embodiments.

Referring to FIG. 1 components of a printing system 100 utilized in accordance with carrying out the embodiments is illustrated. A printing system includes a user interface 110, a digital front end (DFE) 120, and a print engine 130. The DFE 120 can include access to modules 125 that assist with automated media selection (AMS), typically embodied in software, and also modules that enable image processing and control functions such as those described with respect to FIGS. 2 and 3. It can be appreciated that an AMS module could also be accessed through a pre-press system rather than the DFE 120 print controller. The print engine 130 has access to media 135 of various size and cost. A sorter 140 operates after a job is printed by the print engine 130 to manage arrangement of the print job, which can include cutting functions. A user can access and operate the printing system 100 using the user interface 110 or via a workstation 150. A workstation communicates with a printing system 100 utilizing a communications network 160. A user profile, work product for printing, media library and print job parameters can be stored in a database or memory 170 accessible by the workstation 150 or printing system 100 via the network 160, or can be directly accessed via the printing system 100.

Figure 2:
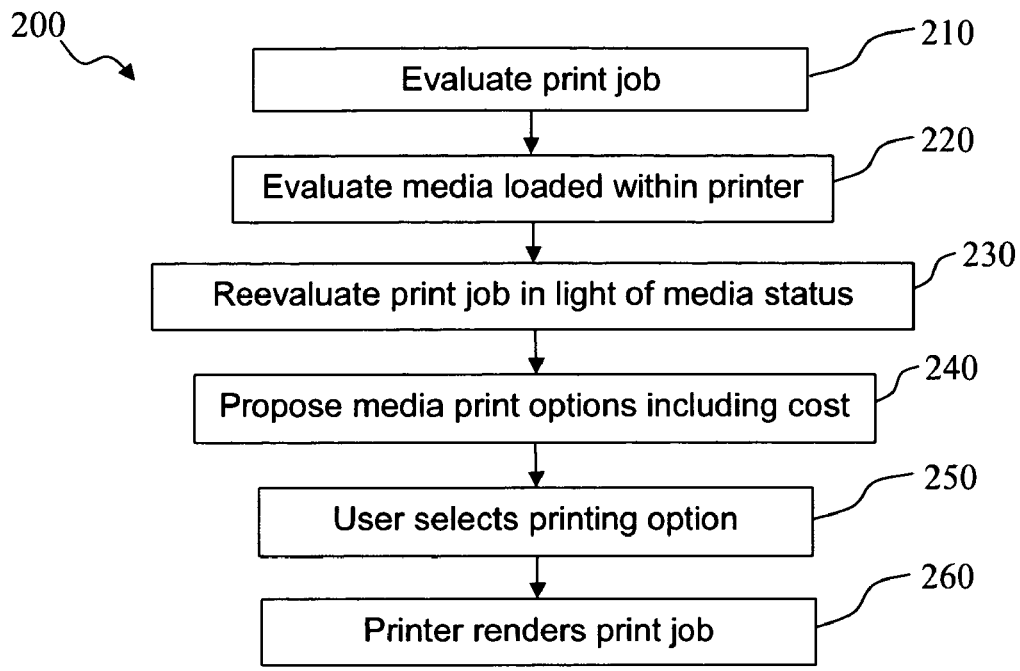
FIG. 2 illustrates a flow diagram of process steps in accordance with features of the embodiments.

Referring to FIG. 2, a flow diagram 200 of a process in accordance with the embodiments is illustrated. As shown in Block 210 a print job is first evaluated by the system. The digital front end (DFE) can be programmed to determine the trim size for the job. The invention can be implemented as a job parameter selection associated with other imposition parameters. When programming imposition job parameters (either on a job by job basis or as part of queue defaults/overrides), the user would be able to specify that the DFE automatically select the desired media based on the trim dimensions of the original job and the selected imposition template. The DFE can automatically use the trim size and imposition template details (which should further specify whether crop marks are required, how much space to leave for gutters, bleed dimensions, how many times to repeat the document across and down the page, etc.) to determine the dimensions for the imposed sheet.

As shown in Block 220, the status of media loaded within the printer is evaluated. During this step, the system compares the imposed sheet dimensions against the media currently available in the print engine and can select the smallest available media that's large enough to print the imposed sheet without clipping the document. For example if the user sends a document with a 8×10 trim size and a 2×1 perfect bind imposition template (16×10 signature) to a print engine with tabloid and 12×18 media available, the DFE can automatically select the tabloid media. If the user changed the imposition parameters to include a 0.5" bleed, and a 0.5" spine trim (17.5"×10 signature), then the DFE can select the 12×18 media.

As shown in Block 230, the system re-evaluated the print job based on available media, or media status at the printer. The system then creates media printing options that can include cost to the user as shown in Block 240. As shown in Block 250, a user presented with printing options is able to select a printing option from the list of options offered by the system. Alternatively, the system can be programmed to automatically select media based on the signature dimensions as will be described with FIG. 3. Such selection can also be based on a user profile, which will also be discussed in more detail below.

Whether selection is made automatically or at user direction, the DFE will determine the desired media for the signature in both the nominal orientation and rotated 90 degrees. If the DFE selects the same media regardless of rotation, then the DFE will RIP the signature without applying rotation. If the rotated signature fits in smaller media than the signature in the nominal orientation, however, then the DFE will select the smaller media and rotate the signature before printing. Considering signature dimensions, in both the nominal and rotated orientations, when automatically selecting media has not been possible until now. Finally, as shown in Block 260, the printer renders the print job in accordance with the user's selected option.

If the DFE determines that there is no media available in the print engine large enough to print the imposed signature, the system can encounter an error prompting the user to load the required media for the requested job. Since the imposed job does not require any specific media, the DFE error message will ask the user to load media that's of the smallest standard size that's large enough to print the imposed signature or larger. For example, if the signature is 16×10, the DFE error message will prompt the users to load tabloid or larger media. In this case, loading either tabloid or 12×18 media will clear the error message and the job will print.

Automatic media selection for imposed jobs has several advantages. From a user's perspective, it simplifies imposition programming since the user no longer needs to check their media selection against the imposed signature to ensure that the imposed document boundaries are within those of the selected media. If the imposition implementation has no reliable preflight, this process can be a lengthy mater of trial and error. Also, since the DFE will automatically rotate the document to determine the best orientation for the job, the user does not need to specify job orientation. In some cases orientation is programmed as a distinct job parameter, in other cases orientation is built into the template with every template having a normal and a rotated version. The new methods described herein present one less job parameter for imposition in the former case. In the latter case, the number of imposition templates can be cut in half without reducing available functionality.

The embodiments would also benefit automated workflows. If media selection is handled automatically, the number of queues required to automatically handle imposition is greatly reduced. For example, to automate DFE imposition the user would normally have to setup a series of queues for each imposition template. Automating 2×1 saddle stitch imposition would require a queue for each signature size and orientation (e.g. letter, letter rotated, tabloid, tabloid rotated, 12×18, 12×18 rotated). Even after these queues were created, jobs requiring a non-standard paper size would have to be handled manually. Furthermore, similar queues would have to be setup for perfect bind imposition and for other imposition templates. If the DFE automatically selected media as described herein, the user could setup a single 2×1 saddle stitch queue to automatically handle all jobs that required this type of imposition regardless of signature dimensions or orientation considerations.

The present methods can substantially reduce the number of queues required to automatically handle imposed jobs. Also, since media is automatically selected, this would eliminate the need to build logic into the prepress workflow to route document to specific queues depending on signature dimensions and orientation.

The methods described herein can be implemented in a DFE as a way to automatically determine how to process and print a job to minimize cost to the print shop. The user can setup a queue or job parameters (e.g., user profile) to instruct the DFE to process and print jobs in the cheapest way possible. Once it was decided that a job needed to be printed in the cheapest way possible, the DFE can operate as shown in FIG. 2.

Figure 3:
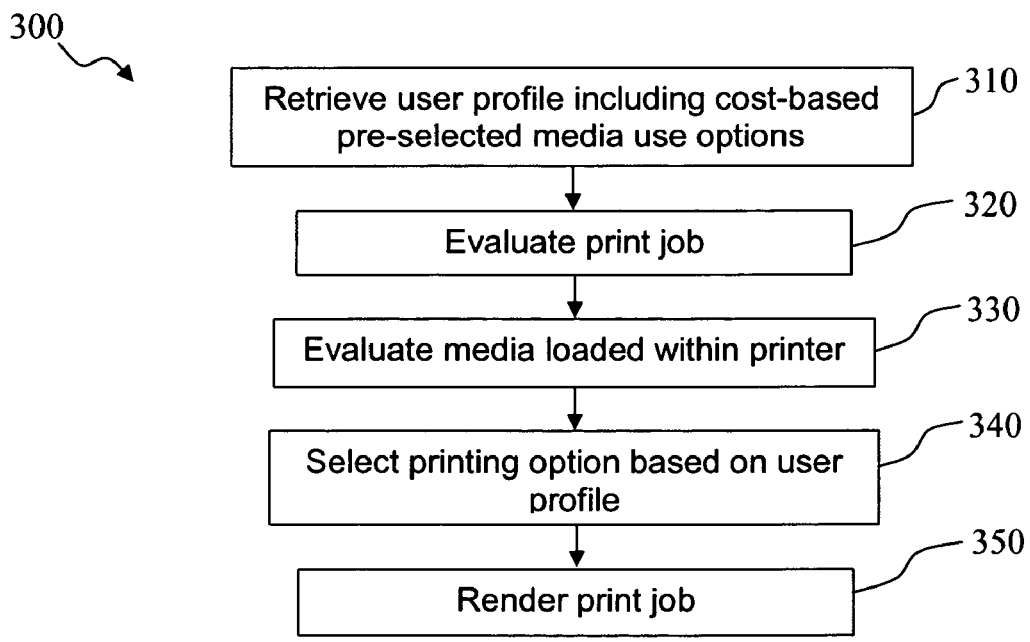
FIG. 3 illustrates another flow diagram of process steps in accordance with additional features of the embodiments.

Referring to FIG. 3, another flow diagram 300 is illustrated in accordance with carrying out the embodiments. A user profile is retrieved by the DFE as shown in Block 310 to determine user preference with regard to at least one of cost and layout. A DFE can evaluate a print job as shown in Block 320 to determine printing parameters. The DFE can evaluate media loaded within the printer as shown in Block 330. As part of evaluating media, a DFE can gather a list of media currently available in the print engine and can also determine which subset of media can be used to print the print job. The DFE can also determine the job dimensions and then rule out any media that's too small to print the job (e.g. if the job was 11×17, the DFE would rule out any letter sized media). When determining whether a media is too small to print a job, the DFE would look at both the nominal and rotated orientations. The DFE would then determine the signature dimensions if the job was imposed using a 2×1 imposition template and a 1×2 imposition template (e.g. for a landscape business card (3.5"×2") the 2×1 dimension would be 7"×2"; the 1×2 dimension would be 3.5"×4"). The DFE then rules out any media that's too small to print the job. Larger media costs more and has a greater click charge than smaller media. If the job cannot be imposed into the larger media, there is no point in evaluating it when deciding how to print the job.

Once the DFE has a list of media that can be used to print the job obtained during operation in Block 330, the DFE can determine for each of the available media a maximum number of times the document can be printed on a given sheet using Multi-Up (i.e., n-Up) Imposition, also as part of the process shown in Block 330. The multi-up imposition number is also referred to as the nUp number. The DFE uses the document dimensions and the media dimensions to determine how many copies of a job can be printed on a sheet in both the nominal orientation and rotated 90 degrees. For example, a portrait business card (2"×3.5") could be printed 9 up on letter media using nominal orientation and 10 up on letter media when rotated 90 degrees. In this case, the DFE would determine that if the job is printed on this media, it should be rotated 90 degrees and printed 10 up.

As shown in Block 340, the DFE has to select a printing option based on media evaluation and the user profile. Once a printing option is chosen that matches a user profile, the printing system will render the print job as shown in Block 350.

An orientation and imposition template associated with each media in the media list can be incorporated in the above-described processes. Using document orientation when determining the imposition template for multi-up imposition has not been possible until now. Once the nUp number has been determined, the DFE can determine the cost to the printer for each page as shown in Block 350, which can include the cost of printing after trimming. To determine the trimmed page cost the DFE can add the page click charge (based on billing specifics) to the media cost (this information can be stored in a media library) and divide by the n-Up for the media. The resulting number is the cost for each finished page on the imposed document. Once the cheapest printing method is determined, the DFE can rotate the document (if needed) impose and output on selected media as shown in Block 260.

The presented methods can automate what is currently a very manual process in part of the customer. Automating print imposition and media selection processes eliminates the need for the customer to determine whether the prepress time consumed in imposing a document is worth the cost savings from reduced click charges and media costs. The present methods will clearly add value to user workflows.

It is also appreciated that various other alternatives, modifications, variations, improvements, equivalents, or substantial equivalents of the teachings herein that, for example, are or may be presently unforeseen, unappreciated, or subsequently arrived at the applicants or others are also intended to be encompassed by the claims and amendments thereto.

What is claimed is:

1. A method using a printing system comprising a controller programmed for rendering imposed documents given media cost considerations, the method comprising the steps of:
   evaluate a print job, wherein the controller compares imposed sheet dimensions against media available in a print engine associated with the printing system and selects the smallest available media that's large enough to print the imposed sheet on without clipping in the document;
   evaluate media loaded within printer, wherein the system is programmed to automatically select media based on printable document dimensions; and
   determine media print options including cost, wherein the controller determines media and printing options for the signature in both the nominal orientation and rotated 90 degrees.

2. The method of claim 1 further comprising programming the controller to determine trim size for an imposed document.

3. The method of claim 2 wherein a user is able to specify that the controller automatically select the desired media based on the trim dimensions of the imposed document and an imposition template.

4. The method of claim 2 wherein the controller automatically uses the trim size and imposition template details to determine the dimensions for the imposed document.

5. The method of claim 1 wherein the system proposes media printing options including cost to the user.

6. The method of claim 5, wherein a user presented with printing options from the controller selects a printing option from the list of options offered by the system.

7. The method of claim 1 wherein the system is programmed to automatically select media based on printable document dimensions and the automatic selection of media is based on a user's profile.

8. The method of claim 1 wherein if the controller selects the same media for the signature regardless of rotation, then the controller will RIP the signature without applying rotation, but if the rotated signature fits in smaller media than the signature in the nominal orientation, the controller will select the smaller media and rotate the signature before printing.

9. The method of claim 8 wherein the controller causes the print engine to render a print job in accordance with at least one of a user's selection of a print option or a user profile.

10. A method using a printer comprising a controller programmed for rendering imposed documents given media cost considerations, the method comprising the steps of:
    evaluating a print job comprising at least one imposed document, wherein the controller determines media and printing options for the signature in both the nominal orientation and rotated 90 degrees;
    evaluating media loaded within printer;

determining media print options including cost; and enabling user selection of printing option prior to the printing system rendering the print job.

11. The method of claim 10 further comprising programming the controller to determine the trim size for at least one imposed document.

12. The method of claim 10 wherein the system proposes media printing options including cost to the user.

13. The method of claim 10, wherein a user presented with printing options from the controller selects a printing option from the list of options offered by the system.

14. The method of claim 10 wherein if the controller selects the same media for the signature regardless of rotation, then the controller will RIP the signature without applying rotation, but if the rotated signature fits in smaller media than the signature in the nominal orientation, the controller will select the smaller media and rotate the signature before printing.

15. A method using a printer comprising a controller programmed for rendering imposed documents given media cost considerations, the method comprising the steps of:

retrieving a user profile including pre-selected media use options based on cost;

evaluating a print job, wherein the controller determines media and printing options for the signature in both the nominal orientation and rotated 90 degrees;

evaluating media loaded within printer;

selecting printing option based on user profile; and rendering print job.

16. The method of claim 15 wherein a user profile specifies that the controller automatically select the desired media based on the trim dimensions of the imposed document and an imposition template.

17. The method of claim 16 wherein the controller automatically uses the trim size and imposition template details to determine the dimensions for the imposed document.

18. The method of claim 15 wherein the controller compares the imposed sheet dimensions against media available in the print engine and can select the smallest available media that's large enough to print the imposed sheet without clipping the document.

19. The method of claim 15 wherein the system is programmed to automatically select medial based on printable document dimensions.

20. The method of claim 15 herein the controller selects the same media for the signature regardless of rotation, then the controller will RIP the signature without applying rotation, but if the rotated signature fits in smaller media than the signature in the nominal orientation, the controller will select the smaller media and rotate the signature before printing.

* * * * *